Figure 1:
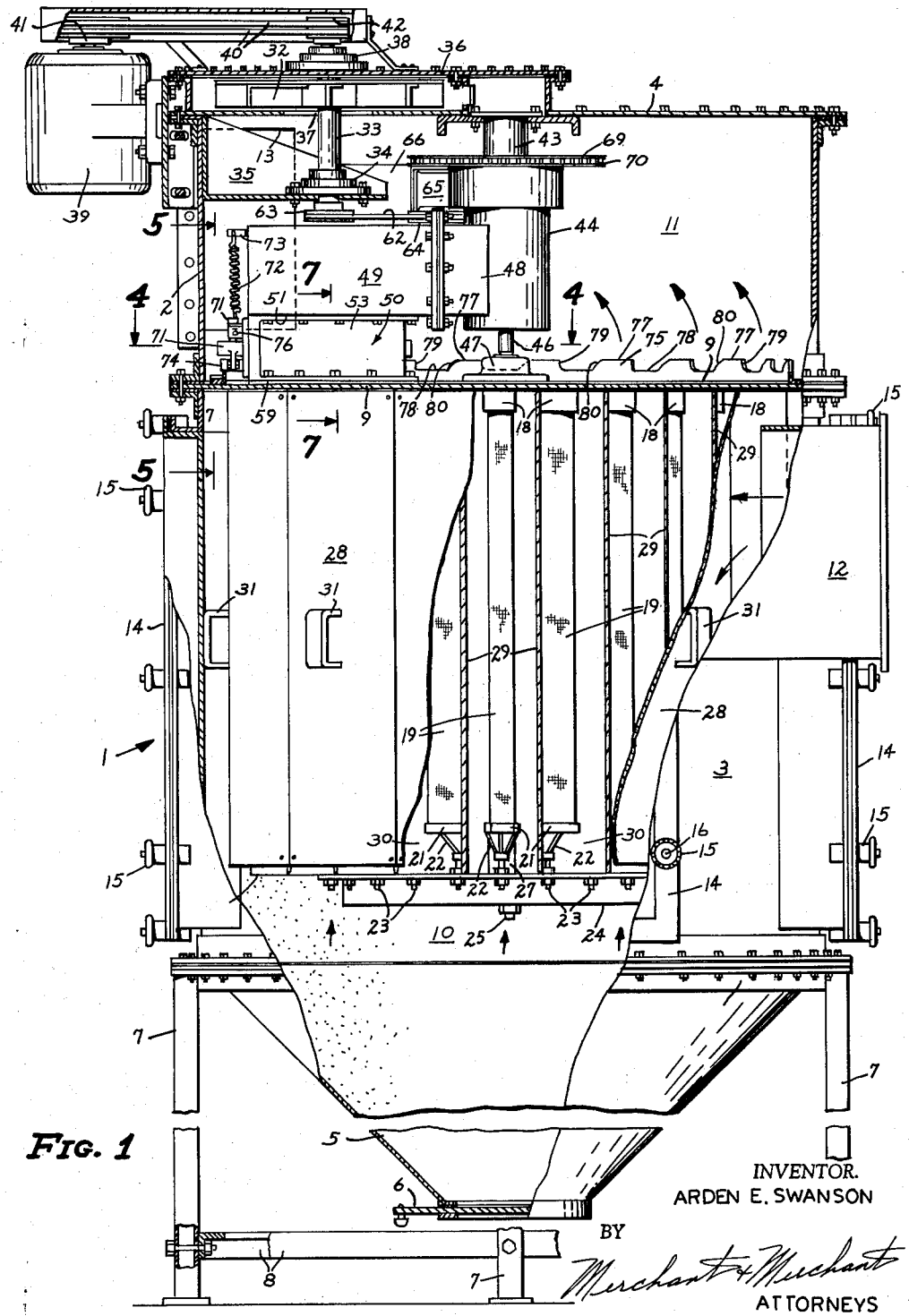

INVENTOR.
ARDEN E. SWANSON
BY
Merchant & Merchant
ATTORNEYS

INVENTOR.
ARDEN E. SWANSON
BY
Merchant & Merchant
ATTORNEYS

March 14, 1961 A. E. SWANSON 2,974,748
AIR FILTER
Filed Dec. 16, 1959 4 Sheets-Sheet 3
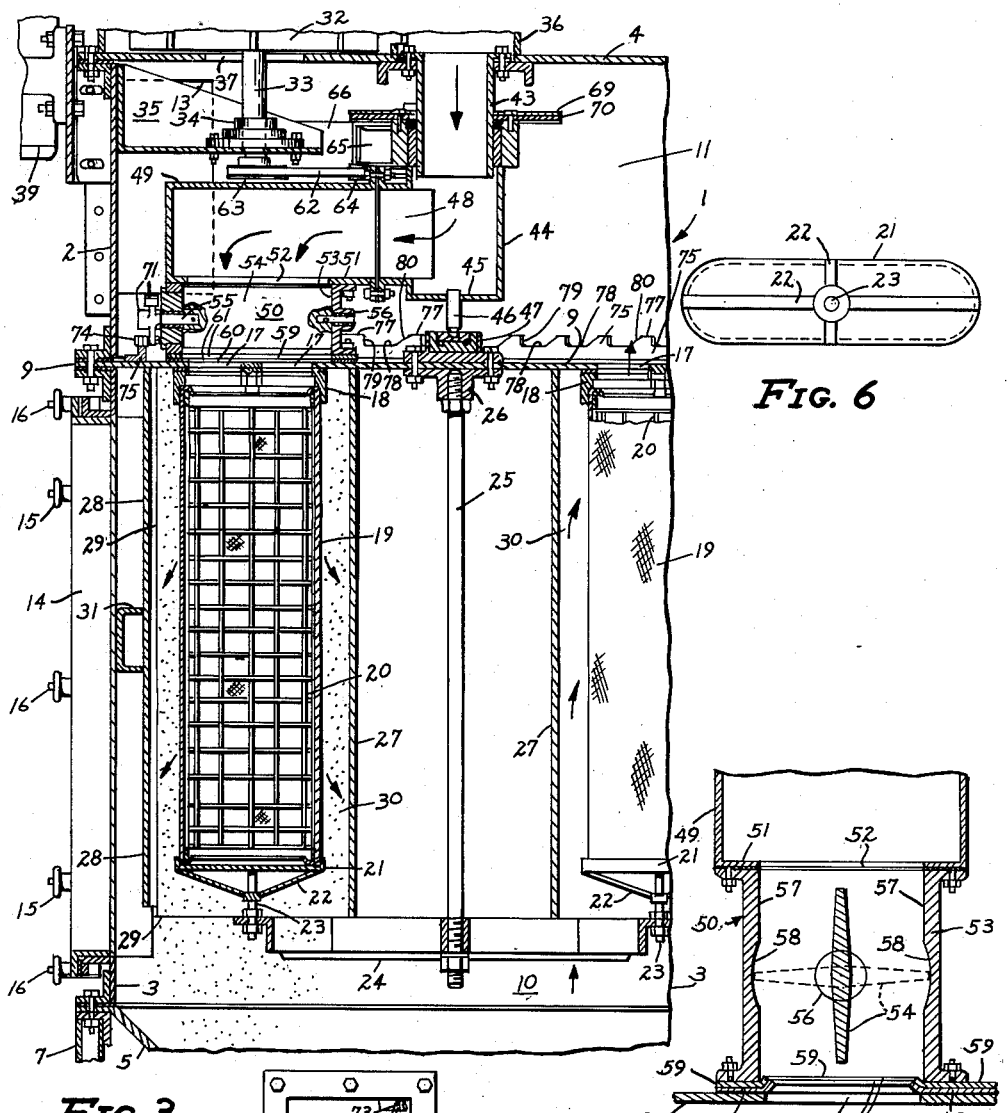
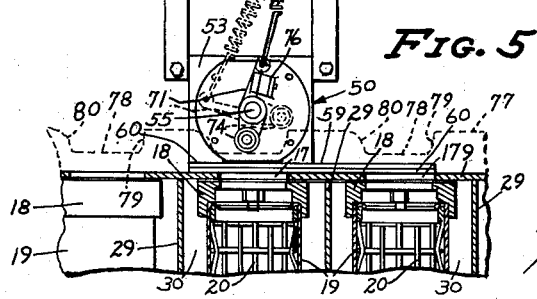
INVENTOR.
ARDEN E. SWANSON
BY
Merchant & Merchant
ATTORNEYS March 14, 1961
A. E. SWANSON
2,974,748
AIR FILTER
Filed Dec. 16, 1959
4 Sheets-Sheet 4
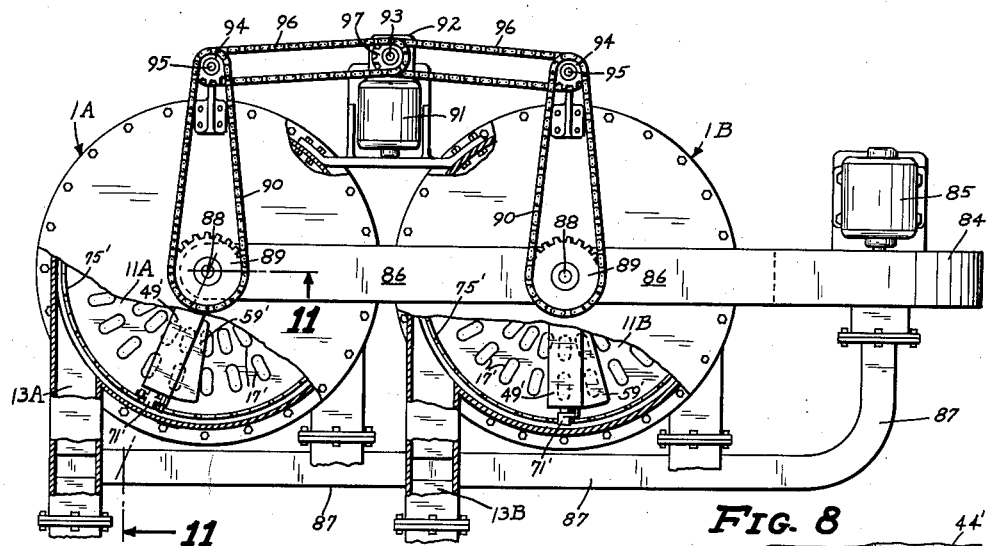
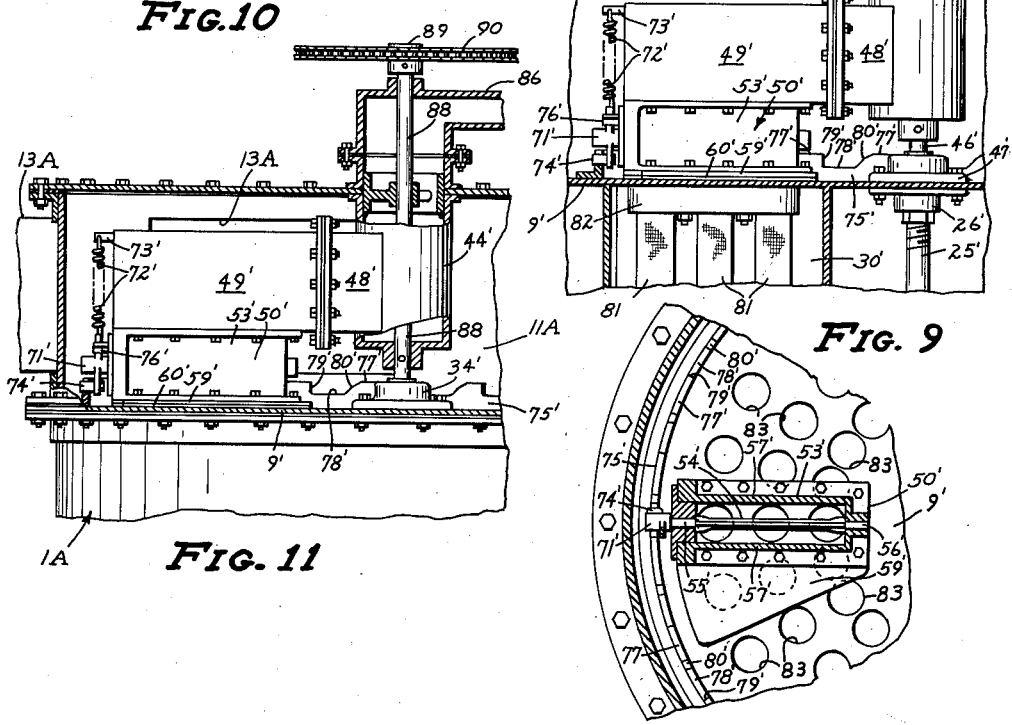
INVENTOR.
ARDEN E. SWANSON
BY
Merchant & Merchant
ATTORNEYS United States Patent Office 2,974,748
Patented Mar. 14, 1961

2,974,748
AIR FILTER
Arden E. Swanson, Minneapolis, Minn., assignor to The Day Company, Minneapolis, Minn., a corporation of Minnesota
Filed Dec. 16, 1959, Ser. No. 860,021
6 Claims. (Cl. 183—57)

This invention relates broadly to a new and improved dry type air filter adapted to remove solid particles from dust laden air in mills, grain elevators, and the like, wherein the presence of dust is objectionable. In particular, the invention contemplates an improved air filter characterized by novel structure adapted to clean individual filter elements by forcing a reverse flow of air to each filter element in sequence.

Air cleaning equipment may consist of washers or scrubbers, dry or viscous filters, or electric precipitators. In many types of air conditioning installations dry filtration is preferable to air washing since it provides effective cleaning without adding moisture to the air. There are several types in common use; the viscous filter depending upon the dust impinging on a surface covered with a viscous fluid or oil; and the dry filter, which removes dust particles from the air by straining or filtering through cloth, felt or paper screens, the openings in which are too small to allow the passage of the dust particles, or which removes said particles by passage through tortuous passages. This invention is concerned with a new and improved type of dry air filter having improved cleaning means and greater efficiency, and is in the nature of an improvement of the structure disclosed in my prior United States Letters Patent No. 2,844,216.

The desiderata for all types of filters are well known. They should be efficient in dirt removal and interpose low resistance to air flow. Moreover, they should possess large dust holding capacity and should be easy to clean and handle. While many of the dry filters commonly found in the prior art possess some of these requirements, nevertheless, they all contain inherent shortcomings because of their structural features and functional design.

Accordingly it is a broad object of the present invention to provide an improved air filter.

Another object of this invention is to provide air filtering apparatus characterized by efficiency in operation and simplicity in design.

Another object of this invention is to provide in an air filter of the type using a reverse flow of air under pressure for cleaning the filter elements, novel means for porting each filter element in communication with the air passageway leading to individual filters.

Still another object of this invention is to provide in an air filter new and improved means for controlling the flow of cleaning air into each filter element thereof.

Yet another object of this invention is to provide in an air filter having means for introducing a reversed cleaning flow of air under pressure to each of the filters contained therein, novel means for engaging each of the air filters in succession with the means for conducting air under pressure thereto.

Another object of this invention is to provide in an air filter having a rotatable upper mechanism adapted to supply air under pressure to filter elements located therebelow, and novel means for opening and closing the air passage way into the filters.

A further object of this invention is to provide an air filter apparatus adapted to convey dust laden air therethrough and extract the air therefrom and to continuously clean each filter element therein in a sequential manner.

A still further object of this invention is to provide in an air filter having means for cleaning air filters therein novel means for preventing the immediate counter flow of air through the filter just cleaned.

These and other objects and advantages of the invention will become apparent from a consideration of the following detailed specification, appended claims, and accompanying drawings.

Figures 2, 4:
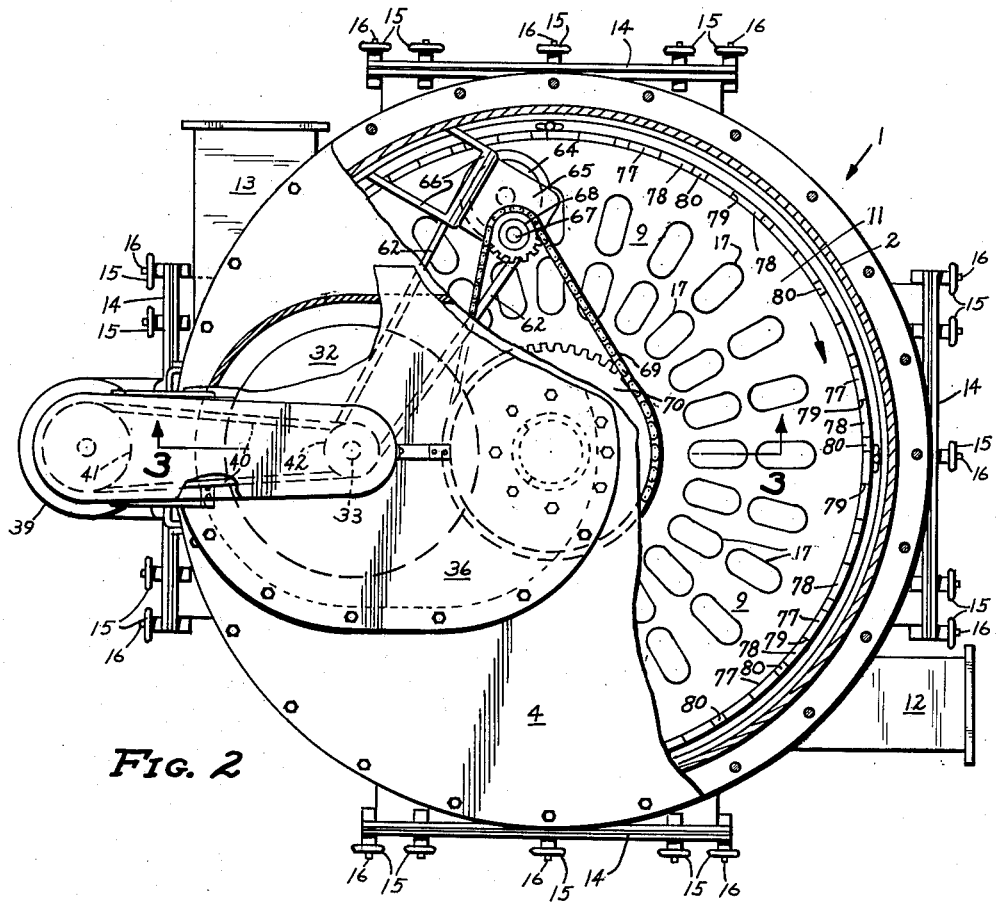

Referring to the drawings wherein like characters indicate like parts throughout the several views:
Fig. 1 is an elevational view of my improved air filter, some parts being broken away, and some parts being shown in section;
Fig. 2 is a top plan view, some parts being broken away and some parts being shown in section;
Fig. 3 is an enlarged fragmentary view in section taken substantially on the line 3—3 of Fig. 2;
Fig. 4 is an enlarged fragmentary horizontal section taken substantially on the line 4—4 of Fig. 1;
Fig. 5 is an enlarged fragmentary view partly in elevation and partly in section, taken on the line 5—5 of Fig. 1;
Fig. 6 is a bottom plan view of one of the parts of the invention;
Fig. 7 is an enlarged sectional view taken on the line 7—7 of Fig. 1;
Fig. 8 is a view corresponding to Fig. 4, but showing a modified filter element arrangement;
Fig. 9 is a fragmentary view in section taken substantially on the line 9—9 of Fig. 8;
Fig. 10 is a view in top plan of a modified arrangement involving a plurality of air filters; and
Fig. 11 is an enlarged fragmentary section taken substantially on the lines 11—11 of Fig. 10.

In the preferred embodiment of the invention illustrated in Figs. 1-7, a generally cylindrical casing, indicated in its entirety by the numeral 1, is shown as comprising upper and lower cylindrical casing sections 2 and 3 respectively, a top wall element 4 and a frusto-conical hopper-like bottom section 5 the lower end of which is normally closed by a sliding gate or the like 6. The casing 1 is supported by a plurality of upstanding legs 7 that are connected near their lower ends by structural members 8. Interposed between the cylindrical casing sections 2 and 3 is a horizontally disposed partition 9 which divides the interior of the casing 1 into a separating chamber 10 and an overlying filtered air chamber 11. The casing section 3 is provided with an inlet passage 12 that is adapted to be connected to a source of dust laden air, not shown, and the casing section 2 is provided with a filtered air discharge passage 13. Further, the casing section 3 is provided with a plurality of circumferentially spaced access plates or the like 14 that are releasably locked in place by knobs 15 that are screw threadedly received on outwardly projecting mounting studs or the like 16.

The partition 9 is perforated to provide a plurality of circumferentially spaced pairs of outlet passages 17 which connect the separating chamber 10 and the filtered air chamber 11. Mounting collars or flanges 18, one for each pair of the outlet passages 17, are suitably mounted to the bottom surface of the partition 9 and support the upper ends of elongated tubular filter elements 19. The filter elements 19 are preferably formed from woven fabric and are supported by tubular members 20 made from coarse mesh screen or the like. The lower ends of the filter elements are closed by suitable closure plates or the like 21 having spider elements 22 thereon that are supported by mounting studs or the like 23 that extend upwardly from an annular frame 24 that is suspended from the partition 9 by a hanger rod 25. The hanger rod 25 is disposed axially of the cylindrical casing 1, and has its upper end screw threaded into a mounting flange 26 that is bolted or otherwise rigidly secured to the central portion of the partion 9.

The hanger rod 25 and annular frame 24 further support a baffle system comprising inner and outer concentric shells 27 and 28 respectively and circumferentially spaced radial partitions or baffle members 29. The baffle members 29 cooperate with the inner and outer shells 27 and 28 and the partition 9 to define downwardly opening compartments 30 each containing one of the filter elements 19. A plurality of spacer elements or the like 31 mounted on the outer surface of the tubular shell 28, engage the inner wall surface of the casing section 3 to properly dispose the shells 27 and 28 in proper concentric relation to the casing section 3.

With reference particularly to Figs. 1 and 2, it will be seen that the inlet passage 12 is disposed at the upper end portion of the separating chamber 10 and substantially tangentially of the casing section 3. Dust laden air is introduced through the inlet passage 12 to the annular space between the casing section 3 and the outer tubular shell 28, the dust laden air moving circumferentially in said space and downwardly toward the bottom section 5. During such movement, the heavier dust particles are thrown outwardly and downwardly to be collected at the lower end of the hopper-like bottom section 5, from whence the accumulated dust may be periodically removed by opening the gate 6. The dust laden air is introduced to the separating chamber 10 by conventional means, not shown, which means may be a blower interposed between the inlet passage 12 and the source of dust laden air, or a suction fan operatively coupled to the discharge passage 13. As the dust laden air approaches the space defined by the bottom section 5, it reverses its direction and moves upwardly into the several compartments 30, inwardly through the porous walls of the filter elements 19, upwardly through the outlet passages 17 to the chamber 11 and outwardly through the discharge passage 13.

The filter elements 19 are of such character that air moves freely therethrough, leaving the entrained dust deposited on the outer wall surfaces of the filter elements. To prevent the filter elements 19 from becoming choked with the dust particles, I provide novel means, now to be described, for periodically removing the accumulated dust from the outer surfaces of the several filter elements 19. A fan or blower 32 is mounted on a vertically disposed shaft 33 that is journalled at its lower end portion in a bearing 34 within the filtered air chamber 11, the bearing 34 being rigidly mounted on a bearing bracket 35 that is welded or otherwise rigidly secured to the inner surface of the casing section 2, see Figs. 1 and 3. The blower 32 preferably overlies the top plate 4 and is enclosed therebetween and a housing 36, the shaft 33 extending upwardly through a filtered air inlet opening 37 in the top wall 4 and journalled at its upper end portion in a second bearing 38 rigidly secured to the housing 36. The blower 32 is driven by a motor 39 suitably mounted adjacent the upper end of the casing 1, through the medium of endless drive belts 40 entrained over a pulley 41 fast on the drive shaft of the motor 25 and a second pulley 42 rigidly secured to the upper end of the blower shaft 33, see particularly Fig. 1.

An air outlet tube 43 is rigidly secured to the top 4 of the casing 1 and extends downwardly through an axial opening therein, the outlet tube 43 communicating with the interior of the blower housing 36. A generally cylindrical air chamber 44, concentric with the air outlet tube 43, is journalled on the lower end portion thereof and is enclosed at its bottom by a lower end wall 45, from which depends an axial shaft 46 that is journalled at its lower end in a bearing 47 rigidly mounted on the top surface of the partition 9. The chamber 44 is formed to provide a radial outlet passage 48 to which is rigidly secured a radially extending generally rectangular manifold 49. A quick opening valve 50 is bolted or otherwise rigidly secured to the bottom wall 51 of the manifold 49, said bottom wall 51 being provided with an opening 52 which communicates with the interior of the valve 50. The valve 50 is of the type generally known as a butterfly valve and comprises a generally rectangular casing 53 and a plate-like valve element 54 that is provided at its opposite ends with trunnions 55 and 56 that are journalled in the end walls of the valve casing 53. As shown in Fig. 7, the opposite side walls 57 are formed to provide arcuate seat portions 58 which engage the opposite longitudinal edges of the plate-like valve element 54 to provide a seal when the valve element 54 is moved to its valve closed position, as indicated by dotted lines in Fig. 7. The valve 50, at its open bottom, is provided with a follower plate 59 and an underlying plate-like sealing member 60, which makes sealing contact with the top surface of the partition 9. The follower plate 59 and seal 60 are formed to provide aligned openings 61 for direct communication with the interior of the valve 50 and which are adapted to register with each pair of outlet passages 17 in succession as the air chamber 44, manifold 49 and valve 50 are rotated about the common axis of the air chamber 44 and casing 1. It will be noted that the follower plate 59 and sealing member 60 extend laterally from the trailing side of the valve 50, for a purpose which will hereinafter become apparent.

For imparting rotary movement to the air chamber 44, manifold 49 and valve 50, whereby to move the valve 50 into register with the several pairs of outlet passages 17 in succession, I provide an endless transmission belt 62 which is entrained over a pulley 63 fast on the lower end of the shaft 33, and a second pulley 64, mounted fast on the input shaft of a conventional speed reduction transmission mechanism, not shown, but which may be assumed to be contained in a housing 65 that is rigidly secured to the casing section 2 by means of a bracket 66. The transmission mechanism includes a relatively low speed output shaft 67 on which is rigidly mounted a sprocket wheel or the like 68 over which is entrained an endless link chain 69 that is also entrained over a second toothed sprocket 70 that is mounted fast on the upper end portion of the air chamber 44.

It will be appreciated that a sudden jar or shock impact applied to the filter elements 19 is more effective in dislodging dust from the exterior surfaces of the filter elements than would be achieved from a reverse current of air through the filter elements, which reverse current gradually increases from zero to maximum volume and then decreases to zero volume, as would occur without the use of the valve 50, or if the valve element 54 were maintained open at all times during rotation of the air chamber 44, manifold 49 and valve 50. For the purpose of admitting air from the blower 32 in a reverse direction to the normal air flow, to the interiors of the several filters 19 in succession and in a sudden blast to the interior of each filter, I provide means for suddenly moving the plate-like valve element 54 from its closed dotted line position of Fig. 7 to its open full line position of Fig. 7, when the openings 61 in the follower plate 59 and sealing member 60 are in full register with each cooperating pair of openings 17. This means comprises an operating lever 71 that is rigidly secured intermediate its ends to the outwardly extended end of the trunnion 55, a coil tension spring 72 that is connected at one end to one end of the lever 71 and at its other end to an anchoring bracket 73 on the manifold 49, a cam follower roller 74 journalled on the opposite end of the operating lever 71, and an annular cam 75 mounted on the partition 9 in the path of travel of the cam follower roller 74. The spring 72 yieldingly urges the operating lever 71 in a direction of rotary movement to open the valve element 54 to its full line position of Fig. 7, such movement being limited by a stop lug 76 on the adjacent end of the valve body 53 and engaging the operating lever 71. The cam 75 comprises a plurality of circumferentially spaced relatively high dwell surface portions 77 alternating with relatively low dwell surface portions 78, relatively sharp or steep drop surface portions 79, and more gradually sloping surface portions 80 in opposed relationship to the steep surface portions 79. The cam 75 is so positioned that, during rotary movement of the air chamber 44, manifold 49 and valve 50 in a clockwise direction with respect to Figs. 2 and 4, the cam follower roller will be engaged by the relatively high dwell surface portions 77 until the valve 50 is in full register with an underlying pair of cooperating outlet passages 17. Upon reaching such a position, the cam follower roller 74 is moved away from engagement with the adjacent dwell surface portion 77 and the coil spring 72 moves the operating lever 71 suddenly to its full line position of Fig. 5 to quickly dispose the valve element 54 in its open position, whereby the air supplied by the blower 32 enters the underlying filter element in a sudden blast to effectively jar loose any dust particles which adhere to the exterior surface of the filter element 19. As the valve 50 continues to rotate, the roller 74 is engaged by the next gradually sloping portion 80 to close the valve element 54 until the valve 50 is moved into full register with the next successive pair of outlet passages 17. The follower-plate 59, together with its sealing member 60 projects sufficiently rearwardly of the valve 50 with respect to the direction of rotation thereof, to seal closed the previously cleaned filter element during the cleaning of the next successive filter element, whereby to permit the dust particles that are jarred loose from the previously cleaned filter element to drop downwardly and by gravity into the hopper-like bottom section 5 of the casing 1.

It will be appreciated that the reverse air pressure developed by the blower 32 is greater than the normal pressure within the separating chamber 10, and that by opening the valve 50 quickly and holding the same open for a relatively short period of time, a lesser quantity of air for cleaning is required than if the valve 50 were left open. By way of illustration in a given machine, each filter element 19 provides a filter area of approximately four square feet requiring one-half cubic feet of cleaning area per square foot of filter area, or two cubic feet per filter. By rotating the air chamber 44, manifold 49 and valve 50 at a speed of one revolution per minute, and assuming that there are twenty-four filters 19 in the separating chamber 10, the cleaning time for each filter is approximately six-tenths of one second. With a blower 32 capable of delivering fifty cubic feet of air per minute at one pound per square inch a sufficient quantity of air is delivered to each filter to effectively clean the same without loss of pressure from the time the valve 50 opens until the same closes. It will be further appreciated that the pressure of the reverse blast of air through the several filters in succession is greater than the normal pressure of the dust laden air in the separating chamber 10; and that by introducing the reverse current of air to each filter in a sudden blast, a much smaller quantity of air is utilized for thorough cleaning of the filters than would be necessary if the cleaning air were gradually increased from zero to maximum volume, such as would occur if the valve element 54 were slowly opened, or if the valve element 54 were absent and cleaning air gradually introduced to the interior of the filter by moving the openings 61 into registration with the filter openings 17. As the follower plate 59 and sealing member 60 move over each pair of outlet passages 16, following the valve 50, the air within the underlying compartment 30 is in a quiescent state for a period of time sufficient to allow the dislodged dust to settle toward the bottom of the settling chamber defined by the casing section 5, and but a minimum of this dust is subsequently carried back toward the filter elements 19.

The modification illustrated in Fig. 9 comprises an arrangement wherein a plurality, as shown three, of cross sectionally circular filter elements are contained in each compartment 30 in radially spaced relationship, these filter elements being indicated at 81 and being secured at their upper ends to a partition 9' by means of flanges 82 similar to the mounting flanges 18. Outlet passage means connecting the interiors of the several circumferentially spaced radial rows of filter elements 81 to the filtered air chamber 11 comprises outlet passages 83 in the partition 9', one for each of the filter elements 81. Thus, it is seen that the instant invention may involve more than a single arrangement of filters in an air filtering device, and that the filter elements may be of various cross sectional shapes.

Figures 10 and 11 illustrate an arrangement whereby a plurality of filtering devices of the type illustrated in Figs. 1-7 may be continuously cleaned in the manner above-described, with the use of a single blower for providing reverse air blasts, and a single motor for imparting rotary movement to a plurality of manifolds and attached valves. In this embodiment, a pair of casings 1A and 1B are shown as being disposed in side by side relationship, the same having internal arrangements similar to those illustrated in Figs. 1-7. In the form illustrated in Figs. 10-11, the blower 84, driven by a motor 85, is operatively connected to the casings 1A and 1B by a common air conduit 86, the blower 84 receiving filtered air from one or both of the filtered air chambers 11A or 11B through a conduit 87 connected to the filtered air discharge passages 13A and 13B. Each of the filtered air chambers 11A and 11B contain a rotary air chamber 44', a manifold 49' and a valve 50', the air chambers 44' being mounted on shafts 88 that extend axially of their respective casings 1A and 1B, and which at their lower ends are journalled in bearings 34' secured to the partitions 9'. The shafts 88 extend upwardly through the conduits 86, and are provided at their upper ends with sprocket wheels 89 over which are entrained endless link chains or the like 90. The link chains 90 are driven from a common motor 91 having formed therewith a speed reduction transmission mechanism, not shown, but which may be assumed to be contained in a housing portion 92, and having an output shaft 93. The chains 90 are entrained over sprockets 94 mounted on shafts 95 that are driven by endless drive chains 96 which are entrained over drive sprockets 97 rigidly mounted on the shaft 93 and over other sprockets, not shown, on the shafts 95. The above-described drive train is conventional in nature, and is hence shown more or less diagrammatically, showing and description of mounting means for the shafts 25 being omitted in the interest of brevity. It will be noted, however, that the manifolds 49' and their respective valves 50' are rotated in the same direction and at identical speeds to deliver cleaning air to their respective underlying filter elements. The several elements indicated in Figs. 10 and 11 with reference characters having prime marks added, are substantially identical to those elements illustrated in Figs. 1-7 with similar reference characters.

In some installations, the filtered air discharge outlet 13 is connected to a suction fan or blower capable of generating a partial vacuum or negative pressure in the chambers 10 and 11 measuring up to fifteen inches water gauge or approximately three pounds per square foot. When the instant air filter is thus connected to such a blower, use of the reverse blowers 32 and 84 becomes unnecessary, and the valve 50 need only communicate with air under normal atmospheric pressure exterior of the casing 1. With this arrangement as applied to the form of filter illustrated in Figs. 1-7, it is only necessary to remove the blower 32, close the inlet opening 37, and remove a sufficient portion of the blower housing 36 to permit air exterior of the casing 1 to be drawn into the outlet tube 43 and parts connected thereto. Obviously, the use of suitable filter means, not shown, for filtering the air entering the tube 43, is beneficial. When with the instant air filter thus arranged, the pressure differential is sufficient to create the above described blast of air to the interior of each filter element 19 when the valve 50 is opened thereto.

While I have shown and described a commercial embodiment of my novel air filter and two modified arrangements, it will be understood that the same is capable of further modification without departure from the spirit and scope of the invention, as defined in the claims.

What I claim is:

1. In an air filtering apparatus, casing structure defining a separating chamber and a filtered air chamber and at least two spaced apart outlet passage means connecting said chambers, each of said outlet passage means being equipped with air filter means, said casing structure having an inlet passage to said separating chamber adapted to be connected to a source of dust laden air to be cleaned and a discharge passage from said filtered air chamber, air compressor apparatus comprising a blower for supplying air under pressure greater than the pressure of said dust laden air during normal flow of said dust laden air through said filter means and outwardly through said outlet passage means, said blower receiving air from said filtered air chamber, delivery conduit means including a quick opening valve and operatively coupled to said blower, said conduit means being mounted in said filtered air chamber for movements to selectively connect the delivery ends thereof to each of said outlet passages at the output sides of their respective filter means, means for imparting said movements to the conduit means and valve, and means for suddenly opening said valve when the same is moved into register with one of said outlet passage means, whereby to produce a reverse blast of air into said separating chamber through said one of the outlet passage means and its respective filter means to dislodge accumulated dust from said filter means, and for closing said valve as the conduit means and valve are moved away from register with said one of the outlet passage means.

2. In an air filtering apparatus, a generally cylindrical casing structure defining a separating chamber and a filtered air chamber and including a partition common to said chambers, said partition defining a plurality of outlet passages connecting said chambers and arranged in circumferentially spaced relationship about the axis of said casing structure, said casing structure having an inlet passage to said separating chamber adapted to be connected to a source of dust laden air to be cleaned and a discharge passage from said filtered air chamber, a plurality of filter elements mounted in said separating chamber and each operatively associated with a different one of said outlet passages, air compressor apparatus including a blower for supplying air under pressure greater than the pressure of said dust laden air during normal flow of said dust laden air through said filter elements and outwardly through said outlet passages, said blower being connected to said filtered air chamber to receive filtered air therefrom, delivery conduit means operatively coupled to said blower, a quick opening valve in said conduit means, said conduit means and valve being mounted in said filtered air chamber for rotary movement on the axis of said casing structure to connect said valve to each of said outlet passages in succession, means for imparting said rotary movement to said conduit means and valve, and means for suddenly opening said valve, when the same is moved into register with each of said outlet passages, whereby to produce a reverse blast of air into said separating chamber to each filter element in succession to dislodge accumulated dust from said filter element, and for closing said valve as the conduit means and valve are moved away from register with each of said outlet passages.

3. The structure defined in claim 2 in which said valve includes a platelike butterfly valve element rotatable between open and closed positions, and in which said means for opening and closing the valve comprises a spring and a cam follower element operatively coupled to said valve element, and an annular cam mounted on said partition in the path of movement of said cam follower during rotation of said conduit means and valve, said spring yieldingly urging said valve element toward a valve open position, said cam and cam follower element being responsive to rotation of said conduit means and valve to close said valve element against the bias of said spring.

4. In an air filtering apparatus, casing structure defining a separating chamber and a plurality of spaced outlet passages each equipped with air filter means, said casing structure having an air inlet passage to said separating chamber adapted to be connected to a source of dust laden air to be cleaned, clean air conduit means for connection to a source of filtered air under substantially constant pressure greater than the pressure of dust laden air during normal flow of said dust laden air through said filter means and outwardly through the outlet passages associated therewith, a quick opening valve in said conduit means including a valve element movable between open and closed positions, said conduit means and valve being mounted on said casing structure for movement in a direction to connect said valve to each of said outlet passages in succession at the output sides of their respective filter means, means for imparting said movements to the conduit means and valve, and means for suddenly opening said valve when the same is moved into register with one of said outlet passages, whereby to produce a reverse blast of air into said separating chamber through said one of the outlet passages, whereby to produce a reverse blast of air into said separating chamber through said one of the outlet passages and its respective filter means to dislodge accumulated dust from said filter means, and for closing said valve as the conduit means and valve are moved away from register with said one of the outlet passages, said last mentioned means comprising a valve element movable between open and closed positions, a yielding element biasing said valve element toward a valve open position, and a cam and a cooperating cam follower element, one on said casing structure and the other operatively connected to said valve element and operative to close said valve against bias of said yielding element.

5. The structure defined in claim 4 in further combination with a closure element mounted on the delivery end of said conduit means for movements into and out of register with said outlet passages in following relationship to said conduit means to temporarily close said passages in succession immediately following departure therefrom of said conduit means.

6. In an air filtering apparatus, casing structure defining a separating chamber and a plurality of spaced outlet passages each equipped with air filter means, said casing structure having an air inlet passage to said separating chamber adapted to be connected to a source of dust laden air to be cleaned, clean air conduit means for connection to a source of filtered air under substantially constant pressure greater than the pressure of dust laden air during normal flow of said dust laden air through said filter means and outwardly through the outlet passages associated therewith, a quick opening valve in said conduit means including a valve element movable between open and closed positions, said conduit means and valve being mounted on said casing structure for movement in a direction to connect said valve to each of said outlet passages in succession at the output sides of their respective filter means, means for imparting said movements to the conduit means and valve, and means for suddenly opening said valve when the same is moved into register with one of said outlet passages, whereby to produce a reverse blast of air into said separating chamber through said one of the outlet passages and its respective filter means to dislodge accumulated dust from said filter means, and for closing said valve as the conduit means and valve are moved away from register with said one of the outlet passages, said last mentioned means comprising a yielding element biasing said valve element toward one of said positions thereof, and a cam and a cooperating cam follower element one on said casing structure and the other operatively connected to said valve element and operative to move said valve element to the other of said positions thereof against bias of said yielding element.

References Cited in the file of this patent

UNITED STATES PATENTS

| | | |
|---|---|---|
| 2,369,649 | Abrams | Feb. 20, 1945 |
| 2,732,912 | Young | Jan. 31, 1956 |

FOREIGN PATENTS

| | | |
|---|---|---|
| 781,022 | France | Feb. 18, 1935 |
| 598,428 | Great Britain | Feb. 18, 1948 |
| 767,220 | Great Britain | Jan. 30, 1957 |
| 313,987 | Switzerland | July 14, 1956 |